United States Patent

Flautt et al.

Patent Number: 6,020,064
Date of Patent: Feb. 1, 2000

[54] NONAQUEOUS SIZING FOR GLASS AND CARBON FIBERS

[75] Inventors: Martin C. Flautt; Yadi Delaviz, both of Granville; Gary Gao, Newark, all of Ohio

[73] Assignee: Owens Corning Fiberglas Technology, Inc., Summit, Ill.

[21] Appl. No.: 08/855,422

[22] Filed: May 13, 1997

[51] Int. Cl.[7] .................................. B32B 9/00; C08F 8/00
[52] U.S. Cl. ........................ 428/367; 428/375; 428/378; 428/391; 428/392; 525/191; 525/403; 525/437; 525/432; 525/452
[58] Field of Search ...................... 525/191, 403, 525/437, 452, 432; 428/367, 375, 378, 391, 392

[56] References Cited

U.S. PATENT DOCUMENTS

| | | |
|---|---|---|
| 3,615,310 | 10/1971 | Long . |
| 4,136,069 | 1/1979 | Vachon et al. . |
| 4,173,680 | 11/1979 | Vachon et al. . |
| 4,419,499 | 12/1983 | Coran et al. . |
| 4,487,797 | 12/1984 | Watson . |
| 4,524,040 | 6/1985 | Hergenrother . |
| 4,530,860 | 7/1985 | Johnson . |
| 4,537,107 | 8/1985 | Armstrong et al. . |
| 4,537,610 | 8/1985 | Armstrong et al. . |
| 4,537,917 | 8/1985 | Hergenrother . |
| 4,539,364 | 9/1985 | Pollet et al. . |
| 4,562,115 | 12/1985 | Hergenrother . |
| 4,567,102 | 1/1986 | Pollet et al. . |
| 4,581,392 | 4/1986 | Armstrong et al. . |
| 4,604,325 | 8/1986 | Pollet et al. . |
| 4,609,591 | 9/1986 | Pollet et al. . |
| 4,647,645 | 3/1987 | Heinrich et al. . |
| 4,752,527 | 6/1988 | Sanzero et al. . |
| 4,789,593 | 12/1988 | Das . |
| 5,063,261 | 11/1991 | Kroker et al. . |
| 5,219,656 | 6/1993 | Klett et al. . |
| 5,258,227 | 11/1993 | Gaa et al. . |
| 5,552,487 | 9/1996 | Clark et al. . |
| 5,710,214 | 1/1998 | Chou et al. . |

*Primary Examiner*—William Krynski
*Assistant Examiner*—J. M. Gray
*Attorney, Agent, or Firm*—Inger H. Eckert

[57] ABSTRACT

A nonaqueous sizing composition useful for coating glass or carbon fibers. The composition comprises one or more epoxy resins, one or more polymers, a lubricant and one or more silane coupling agents. The sizing composition reduces the volatile organic components associated with chemical treatment of glass and carbon fibers while also eliminating the need to disperse or emulsify the ingredients of the composition.

13 Claims, 10 Drawing Sheets

NONAQUEOUS SIZING FOR GLASS AND CARBON FIBERS

TECHNICAL FIELD AND INDUSTRIAL APPLICABILITY OF THE INVENTION

The present invention provides a nonaqueous sizing composition for glass and carbon fibers. The invention further relates to a sizing composition that reduces the amount of volatile organic components (VOCs) associated with chemical treatment of such fibers. There is also no further need to disperse or emulsify the sizing ingredients by this invention. In addition, the invention is directed toward a method of processing glass or carbon fibers that negates the need for drying ovens. The invention further relates to a method of visually quantifying the sizing in the forming process. The invention also provides glass or carbon fibers having a portion of their surfaces coated by the nonaqueous sizing of the invention. The sizing composition of the present invention is useful in a wide range of applications requiring glass or carbon fibers to be used for reinforcement.

BACKGROUND OF THE INVENTION

Sizing compositions are used to improve processing properties of glass or carbon fibers, such as: fiber bundle cohesion, bundling, spreadability, fluff formation resistance, fiber smoothness and softness, abrasion resistance and easy and nondestructive unwindability of bobbined fiber bundles. Sizing also affects the physical properties of the composite containing the treated fibers.

The reinforced plastic industry has been using glass fibers in various forms for reinforcing polymeric matrices to produce a variety of products. Glass fibers have been used in the form of continuous and chopped filaments and strands and rovings and woven and nonwoven fabrics to reinforce polymers. Thermosetting polymeric matrices have been reinforced with a variety of different forms of glass fibers resulting in the production of products such as: sheet molding compounds, bulk molding compounds, pultrusion products, panel products, spray up molding products, etc.

Production of glass fibers for the polymeric reinforcement market involves, attenuation of the glass fibers from molten streams of fiberizable glass material from a bushing or like device connected to a furnace containing molten fiberizable glass material. The glass fibers are attenuated by conventional means such as winders or pull wheels. In the process of producing glass fibers, a chemical composition is applied to them shortly after they are attenuated as the molten streams of glass. Prior to the present invention, the chemical composition has traditionally been an aqueous solution, foam or gel composition containing film forming polymeric materials, coupling or keying agents, lubricants and sometimes processing aids. This chemical composition or sizing is necessary in order to retard inter filament abrasion of the glass fibers when they are gathered into a bundle of glass fibers or strands. It is also required in order to make the glass fibers compatible with polymer matrices that they are used to reinforce. After application of the sizing, the fibers are then dried either in the package form or in the chopped strand form before they are used for reinforcement.

In addition to glass fibers, carbon fibers have been found to combine excellent mechanical properties, such as high tensile strength and high modulus of elasticity, on the one hand, and lightness, high heat resistance and chemical resistance on the other. This combination of properties has led to the increased use of these materials as reinforcing elements in composite materials for a wide range of applications in industries as diverse as aerospace, transportation and sporting goods.

Optimal properties of carbon fibers are only obtained if integral adhesion between the matrix material and the reinforcing fiber is ensured over a wide range of varying temperature and moisture conditions. To achieve this, carbon fibers are given an oxidative surface treatment and subsequently provided with a sizing agent suitable for that fiber and its intended use.

Not only is it necessary that the sizing protect the fiber and impart improved physical properties, but it must also be chemically compatible with the particular matrix material so as to produce the qualitatively high-grade and durable composite materials. Sizing agents can be grouped into two types: the solvent and the emulsion type. In emulsion types, the resins are dispersed in water with the aid of dispersants or emulsifiers. In the solvent type, the polymer, usually a resin, is in solution in a low-boiling organic solvent and is applied to the fibers from a dilute solution. Both forms of sizing add VOCs to the production environment. In addition, emulsion and solvent sizing require drying of the fiber subsequent to application. This adds time and expense to the production process.

Prior to the present invention, the processing of fibers with sizing has required that ovens be used in the process so as to dry the treated fibers. In addition, the previous aqueous sizings contain a significant amount of volatile organic components. The industry, in an effort to prevent environmental problems, has been attempting to find ways of minimizing levels of VOCs while maintaining the physical properties of the fibers.

The present invention of a nonaqueous sizing composition surprisingly not only meets and exceeds environmental concerns over VOCs, but it also reduces the overall cost of producing the treated fibers by eliminating the need for drying ovens. In addition, the application of sizing for glass and carbon fibers in this invention does not require the use of water or solvent; this invention thus, allows for the use of a greater range of polymers, lubricants and new chemistries. Therefore, allowing for a greater range of applications for the use of reinforced plastics.

SUMMARY OF THE INVENTION

The present invention surprisingly provides a nonaqueous sizing composition useful in the production of glass and carbon fibers used as reinforcement. Specifically, the invention provides a sizing that is applied at high temperatures and is useful in glass forming processes where a viscous polymeric liquid with a viscosity around 50–300 cps is applied at a temperature around 50–300° F. The composition of the sizing allows for a glass forming process without the need for drying ovens. The sizing composition may additionally contain an optical brightener/ultraviolet fluorescent dye or colorant which provides a method for visually assessing the uniformity of the size in the forming process; therefore, it is possible to make any necessary adjustments during the forming process.

The present invention of a nonaqueous sizing contains one or more polymers, one or more resins, one or more coupling agents and a lubricant. The sizing contains no water and is applied at elevated temperatures. (nonaqueous elevated application temperatures—NEAT).

Since the present invention is a nonaqueous sizing, the epoxies or resins are not emulsified or mixed with solvents, therefore, the VOCs are significantly reduced. In addition, in the present invention the coupling agents, or more particularly, the silanes are not mixed in water. This avoids hydrolization and the release of VOCs into the production environment.

Another embodiment of the present invention provides a sizing composition wherein there is a blend of two epoxy resins in the composition. The type of resin and molecular weight range as well as ratio of resins to each other depends on the particular end use application of the carbon or glass fibers.

The invention is further related to glass or carbon fibers having at least a portion of their surfaces covered with the sizing composition of the present invention. The invention also relates to a process for producing glass or carbon fibers that does not require drying ovens after application of the sizing composition.

BRIEF DESCRIPTION OF THE DRAWINGS

FIG. 3a shows strength retention plotted versus silane concentration on glass, whereas in FIG. 3b, it is plotted versus silane concentration in the mix. FIG. 3a is plotted without taking the silane concentration in the size and the total strand solids in the glass into account.

FIG. 4b demonstrates the effectiveness of silane when used in nonaqueous sizing. The graphs show dry flex, wet flex and wet strength retention to be good at LOI's from 1–4% in polyester resin. The difference between FIGS. 4a and 4b is the type of silane contained in the sizing. The A187 in FIG. 4a makes it compatible with epoxy resin. The A174 is in this formulation to make it dual compatible. (Can be used in vinylester, polyester and epoxies.) The A174 in FIG. 4b as a single silane optimizes the properties in polyester. Optimum properties are usually achieved in a resin system when using the proper single silane. Blending two or more silanes makes the sizing compatible in multiple resins, however, this may lessen the final properties.

DETAILED DESCRIPTION AND PREFERRED EMBODIMENTS OF THE INVENTION

The sizing composition of the present invention is comprised of one or more low molecular and or medium molecular weight resins, one or more copolymers, a lubricant and one or more coupling agents such as a silane.

When the sizing composition is used additionally as a method of quantifying the forming process the composition also comprises an optical brightener or UV fluorescent dye or colorant. The presence of the brightener provides a method of visually assessing the sufficiency or uniformity of the sizing application process.

In addition to the required components needed to prepare the invention, other components normally added to glass or carbon fiber sizing compositions can also be present, with the caveat that the size ingredients must have high boiling points and be thermally stable. For example, antistatic agents, cross-linking agents or hardeners, antioxidants, etc. Examples of antistatic agents which may be used herein are cation alkoxylated quaternary ammonium salt antistatic agents. Other examples and the amounts that may be used, can be found in U.S. Pat. No. 4,752,527 which description is hereby incorporated by reference.

Examples of cross-linking agents that can be used herein include: monomers, dimers, trimers and higher oligomers. Further examples of crosslinking agents used herein, and the amounts that can be used are exemplified in U.S. Pat. No. 4,752,527 which is hereby incorporated by reference.

Antioxidants which may also be present as an optional component for the preparation of the composition of the present invention include diarylamines, thioethers, hindered phenols, quinones and phosphates that are compatible with the film former and polymer used in the composite. It is preferred to use antioxidants when the sized glass fibers are used to reinforce clear panels. Generally, any of the antioxidants, like those disclosed in U.S. Pat. No. 4,483,948, which is hereby incorporated by reference, can be used.

The nonaqueous sizing composition can be applied to the glass or carbon fibers by any method known to those skilled in the art such as during the formation of the glass fibers or after the glass fibers have cooled to a sufficient temperature to allow the application of the nonaqueous sizing composition. The nonaqueous sizing composition is applied to glass fibers by applicators having belts, rollers and sprayers. Preferably the sizing composition is applied by a heated applicator which is capable of applying or metering small amounts of sizing uniformly to a continuous glass strand. Stationary and dual roll applicators may be used however, the most preferred applicator is a ⅜" KEM.

The nonaqueous sizing of the present invention may be applied at temperatures ranging from −10° F. to 400° F. Preferably, the sizing is applied in the range of 50° F. to 300° F. In a particularly preferred embodiment, the sizing is applied at 225° F. degrees.

The ingredients of the size must be compatible and miscible with each other. They must also be thermally stable during the application process, since any vigorous side reactions could end-up witih viscosity build-up or gel formation of the nonaqueous sizing.

The sizing may be applied at viscosities ranging from 10 to 1500 cps. Preferably, the sizing is applied in the range of 100 to 400 cps. In a particularly preferred embodiment, the nonaqueous sizing is applied at a viscosity of about 200 cps.

The sizing is applied using a heated applicator capable of applying or metering small amounts, such as 1 gram/min–150 grams/min, of sizing uniformly to a glass strand. Preferably the applicator system has a diameter of from ⅜" to 1" and is fed via a hot melt Zenith pump. (Supplied by Parker Hannifin Corp., Zenith Pumps Division, Sanford, N.C.)

Thus, in one embodiment, a sizing composition for treatment of glass or carbon fibers is provided comprising: one or more resins, one or more polymers, one or more coupling agents and a lubricant. Since the nonaqueous size eliminates the need for emulsification or dispersion of resins or other ingredients in water or solvent, nearly any resin with any molecular weight may be used. In a preferred embodiment, the resin may be any resin which is of a low or medium molecular weight.

The polymers and coupling agents may be any ones which are compatible with the low or medium molecular weight resins selected. Coupling agents suitable for the nonaqueous sizing composition may be selected from those used in standard aqueous sizings and are well known in the art. For example, a preferred coupling agent for polyester is a methacryloxy functional one. For epoxies, amine and glycidoxy functionals are preferred.

The composition also contains lubricants which may be described as any chemical which can protect the glass fibers from other fibers or contact points in either the forming operation or some subsequent operation. For example, the A174 silane has been shown to be an excellent lubricant.

Afterwards the treated fibers can be gathered into one or more strands and collected into a package typically referred to as a forming package. In addition, the glass fibers can be collected into one or more strands and chopped. The glass fibers can also be gathered into one or more strands and collected as a roving.

Rather than being dried the fibers, coated with the present invention, are immediately processed. The typical end use of these fibers is in processes where the fibers are continuous. These end uses are normally either filament wound to make pipe or tanks; pultruded to make rods, beams, poles, etc.; or woven or knitted into fabric. This list is an example only as there are many other uses for continuous strands.

EXAMPLE I

Formulation With Two Epoxy Resin Blend

Samples 54A and 54B, nonaqueous sizing composition, was prepared using the components set forth below in Table I. In particular, the sample is made up of a combination of a low (DER 337) commercially available from Dow Chemicals Inc. and medium (ARALDITE 7013) molecular weight epoxy resin. Additionally, the sample included PLURONIC L101 and PLURONIC P105, which are both polyoxyethylene-polyoxypropylene block copolymer surfactants that act as softeners or lubricants; BES, which is butoxyethyl stearate, a lubricant; PEG 400 MO, which is a polyethylene glycol monooleate emulsifier; A174, an aminosilane coupling agent commercially available from OSi Specialties, Inc.; and UVITEX OB, a whitening agent having the composition, 2,2'-(2,5-thiophenediyl) bis (5-tert-butylbenzoxazole), which is commercially available from Ciba-Geigy Corp.

TABLE I

| Component | % Active Solids | Sizing Composition 54A % by Weight |
|---|---|---|
| Dow DER 337 | 100 | 33.78 |
| Ciba-Geigy GT (ARALDITE 7013) | 100 | 33.78 |
| PLURONIC L101 | 100 | 3.79 |

TABLE I-continued

| PLURONIC P105 | 100 | 11.05 |
|---|---|---|
| BES | 100 | 5.0 |
| PEG 400 MO | 100 | 2.50 |
| A174 | 100 | 10.00 |
| UVITEX OB | 100 | 0.10 |

*Tolerance weights listed above were target weights. ±2% variation is acceptable.

Final Mixed Size Properties

| Property | Minimum | Maximum | Average 54A |
|---|---|---|---|
| Mix Solids, % Wt. | TBD | TBD | 94.7 |
| pH | N/A | N/A | N/A |
| Storage Temp. | TBD | TBD | TBD |
| Shelf Life | TBD | TBD | TBD |
| Viscosity, cps @ 200° F. Brookfield | TBD | TBD | 380 |

The sizing composition was maintained at room temperature without agitation. The amount of mixed solids shown in Table I was determined by the standard procedure of exposing the sizing to 110° C. (235° F.) for one hour.

Figure 1:
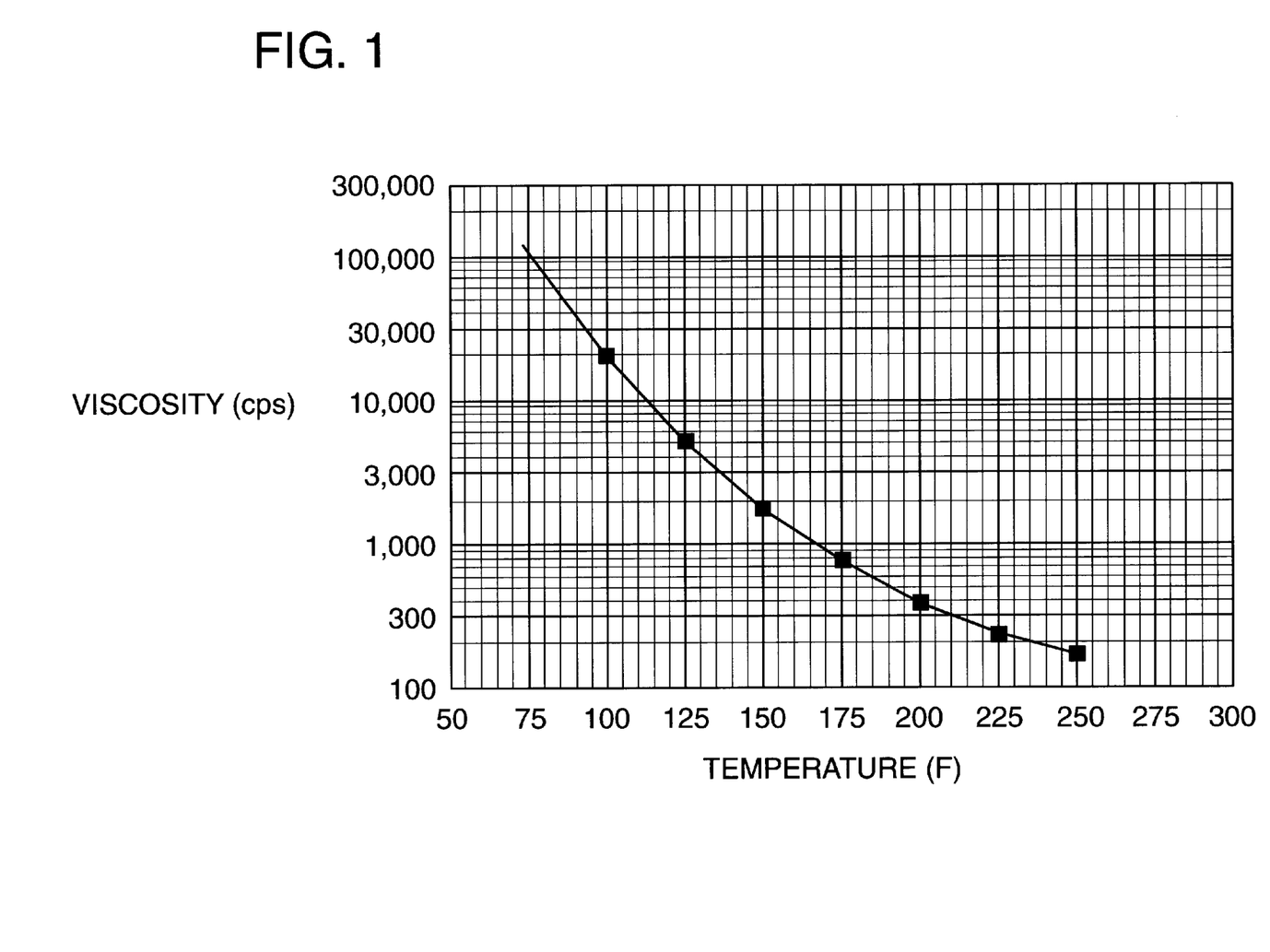
FIG. 1 is a viscosity curve obtained using the sizing composition of the present invention.
Figure 2:
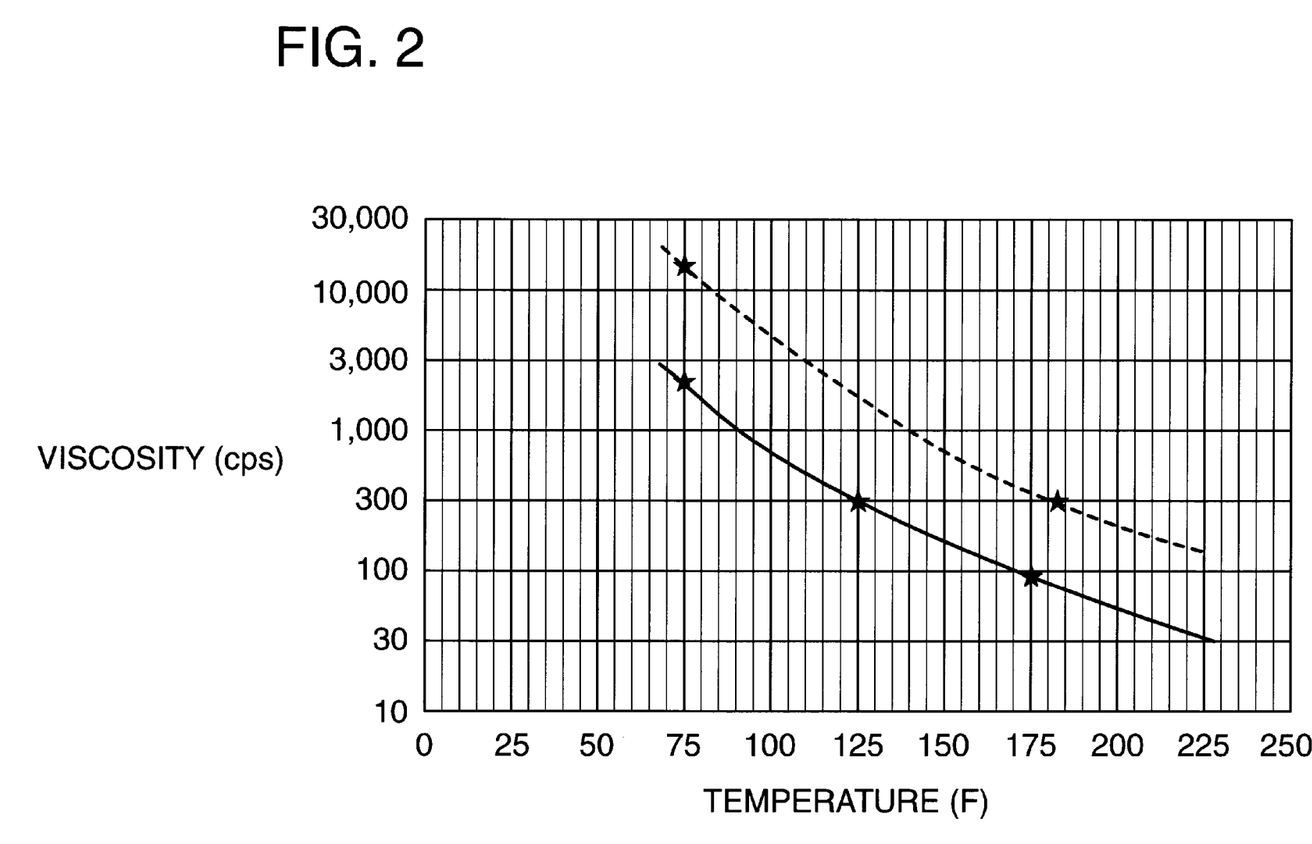
FIG. 2 is a TGA curve used to calculate VOC content.

Using the data from FIG. 2 it is possible to calculate the VOCs. The TGA (thermogravimetric analysis) curve in FIG. 2 measures the amount of weight lost as the sizing is exposed to increasing temperature. At any given temperature, the amount of weight lost can be calculated and expressed as a percentage of the original weight. In the case of determining VOC's by ASTM D2369, the sample would be exposed to 110° C. for one hour and the percent of weight lost would be the number reported as VOC's.

In this TGA curve, the temperature was not held constant at any particular temperature as it was raised at a constant 10° C./min. Thus, the percent weight loss from the TGA curve is only an estimate of what would be lost if the temperature were held at that temperature for an extended period of time.

EXAMPLE II

Formulation With Single Epoxy Resin

Samples A–H, nonaqueous sizing compositions, were then prepared using the components set forth below in Table II. Samples A–H used a single epoxy resin, Clear Blue 7A1, which is an epoxy resin produced by reacting Dow DER 337 with stearic acid and then acetic anhydride.

Sample I was essentially the same as sample 54A in Example I.

TABLE II

| Component | Size No. Formulation | | | | | | | | |
|---|---|---|---|---|---|---|---|---|---|
| | A | B | C | D | E | F | G | H | I |
| Clear Blue 7A1 | 100.0 | 90.0 | 90.0 | 90.0 | 90.0 | 80.0 | 80.0 | 80.0 | — |
| PEG400 MO | — | — | — | — | 10.0 | 10.0 | 10.0 | 10.0 | 5.0 |
| A174 | — | 10.0 | 5.0 | — | — | 10.0 | 5.0 | — | 10.0 |
| A1100 | — | — | 5.0 | 10.0 | — | — | 5.0 | 10.0 | — |
| DER337 | — | — | — | — | — | — | — | — | 33.8 |
| GT7013 | — | — | — | — | — | — | — | — | 33.8 |
| L101 | — | — | — | — | — | — | — | — | 3.8 |
| P105 | — | — | — | — | — | — | — | — | 11.1 |
| BES | — | — | — | — | — | — | — | — | 2.5 |

One hundred grams of each of the A–I formulations were produced. The 100 grams were divided into 10 parts with each part being placed into a 16 ml glass bottle. The bottles were numbered 1–10 and placed in various ovens according to the following chart:

TABLE III

| Size No. | Exposure Hours | Viscosity @ 75° C./167° F. Exposure Temp, ° F. | | | | Viscosity @ 125° C./257° F. Exposure Temp, ° F. | | | |
|---|---|---|---|---|---|---|---|---|---|
| | | Room | 130 | 185 | 235 | Room | 130 | 185 | 235 |
| 32-A | 24 | 240 | 220 | 220 | 240 | 25 | 25 | 25 | 25 |
| | 48 | 240 | 250 | 240 | 240 | 25 | 30 | 25 | 25 |
| | 120 | 250 | 250 | 240 | 240 | 35 | 30 | 25 | 30 |
| 32-B | 24 | 110 | 105 | 200 | 200 | 15 | 15 | 35 | 35 |
| | 48 | 120 | 120 | 320 | 380 | 20 | 20 | 90 | 80 |
| | 120 | 120 | 140 | 330 | 450 | 20 | 20 | 100* | 100* |
| 32-C | 24 | 120 | 145 | 140 | 160 | 15 | 20 | 20 | 20 |
| | 48 | 140 | 145 | 150 | 180 | 20 | 20 | 20 | 20 |
| | 120 | 150 | 150 | 180 | 220 | 20 | 20 | 20 | 30 |
| 32-D | 24 | 120 | 160 | 180 | 180 | 15 | 20 | 25 | 25 |
| | 48 | 140 | 185 | 200 | 205 | 20 | 20 | 25 | 30 |
| | 120 | 155 | 210 | 260 | 320 | 20 | 30 | 20 | 30 |
| 32-E | 24 | 155 | 155 | 160 | 155 | 20 | 25 | 20 | 20 |
| | 48 | 160 | 160 | 160 | 160 | 20 | 20 | 20 | 20 |
| | 120 | 155 | 155 | 160 | 155 | 20 | 20 | 20 | 20 |
| 32-F | 24 | 80 | 140 | Gelled | Gelled | 10 | 20 | Gelled | Gelled |
| | 48 | 100 | 130 | Gelled | 680 | 20 | 20 | Gelled | Gelled |
| | 120 | 90 | 130 | 165? | Gelled | 15 | 20 | Gelled | Gelled |
| 32-G | 24 | 90 | 100 | 110 | 130 | 10 | 15 | 20 | 20 |
| | 48 | 130 | 110 | 140 | 150 | 20 | 20 | 20 | 20 |
| | 120 | 120 | 120 | 160 | 240 | 20 | 20 | 20 | 35 |
| 32-H | 24 | 90 | 110 | 120 | 130 | 10 | 15 | 15 | 20 |
| | 48 | 100 | 140 | 140 | 150 | 20 | 20 | 20 | 25 |
| | 120 | 120 | 160 | 180 | 220 | 20 | 20 | 20 | 25 |
| 32-I (54-A) | 24 | 550 | 635 | 1000+ | Gelled | 80 | 90 | 130 | Gelled |
| | 48 | 620 | 720 | 1000+ | Gelled | 90 | 115 | 370 | Gelled |
| | 120 | 620 | 910 | Gelled | Gelled | 85 | 120 | Gelled | Gelled |

*Partial Gel

1—235° F.—24 hours 6—185° F.—120 hours
2—235° F.—48 hours 7—130° F.—24 hours
3—235° F.—120 hours 8—130° F.—48 hours
4—185° F.—24 hours 9—130° F.—120 hours
5—185° F.—48 hours 10—room temperature All of nos. 1, 4 and 7 were removed from the ovens after 24 hours. The viscosity of each along with the no. 10 sample was measured at 75° C./167° F. and 125° C./257° F. The viscosities were measured with a BYK Gardner Cone and Plate viscometer. Once the measurements were complete, the bottles were set aside for future evaluation. They were maintained at room temperature on the belief that they would remain stable.

The procedure was repeated after 48 and 120 hours using the next set of samples. The same room temperature bottles, the no. 10's were rechecked after 48 and 168 hours as a point of reference.

The viscosity of formulations A,C,D,E, G and H did not change substantially after 120 hours exposure to the 130° F. air temperature when measured at 125° C./257° F. The viscosity of A and E did not change after 120 hours exposure to 235° F. when measured at 75° C./167° F. Other than for the controls, A and E, there was some degree of change in viscosity with regard to either temperature or time.

The most sensitive formulation was F which gelled at 185° F. after 24 hours. This formulation contained both A174 and PEG400MO which have been found to be incompatible at elevated temperatures. The B formulation only has the A174 and although it does increase in viscosity with time, it does not do so to the same extent as when the PEG400MO is present.

The D formulation, which has only A1100 added, behaves similarly to the B formulation, however, it exhibits less viscosity growth. The C formulation containing a blend of A174 and A1100 appears to be far more stable than with either of the silanes used alone. In the G and H formulations, the presence of the A1100 appears to have a stabilizing effect in that it apparently neutralizes the effect of the PEG400MO.

The 32-I formulation which is formulation 54A from Example I, is stable at 130° F. for up to 120 hours. The formulation is also stable for up to 48 hours at 185° F., however it gels after 24 hours at 235° F.

EXAMPLE III

Nonaqueous Sizing With Optical Brightener

The sizing composition was then prepared using a fluorescent dye. The dye was added to the glass fibers as a means of visually and rapidly quantifying the uniformity of the application of the size on the glass fibers. The UV dye was added to the sizing composition in two concentrations 0.1% and 0.5% based on the solids content of the sizing. At both concentrations the dye was visible, however it was extremely visible at the 0.5% level. See Table IV below for the formulations.

TABLE IV

| | Formulation A | | Formulation B | | *Formulation C | |
|---|---|---|---|---|---|---|
| | Size No | | | | | |
| Composition | % As | Grams | % As | Grams | % As | Grams |
| DER 337 | 56.9 | 797.0 | 28.45 | 398.5 | 60.76 | |
| GT 7013 | — | — | 28.45 | 398.5 | — | — |
| L101 | 3.15 | 44.1 | 3.15 | 44.1 | 3.36 | |
| P105 | 9.25 | 129.5 | 9.25 | 129.5 | 9.88 | |
| PEG400MO | 12.87 | 180.2 | 12.87 | 180.2 | 13.74 | |
| A187 | 11.48 | 171.6 | 11.48 | 171.6 | 12.26 | |
| BES | 6.33 | 88.6 | 6.33 | 88.6 | — | |

*This formulation is the NEAT version of 158 B without citric acid, PENTA, and 676OU.

The sizing compositions of Examples I, II and III were prepared as follows. The DER 337 was weighed and added to a properly sized container then heated until the viscosity dropped. This occurred around 125–150 degrees Fahrenheit. The pluronic L101 was then added directly to the container and stirred until it went into solution. The pluronic L105 was added in the same manner as the L101. The PEG 400 MO was weighed and added directly to the container and stirred until in solution, the same was then done for the BES and A187 respectively.

The procedure was different for the formulation B. In that formulation the Ciba-Geigy GT 7013 was the first ingredient added to the container. It was then heated until it became a fluid, this occurred at approximately 150–200 degrees Fahrenheit. The other ingredients were added as in the formulation A described above.

In Example III, the optical brightener or UV dye, Uvitex OB was added to the mixes as the final ingredient. It was added with agitation so as to facilitate good dispersion and solubility in the mix.

The viscosity of the formulation A was found to be an order of magnitude lower than the formulation B at comparable temperatures. It was also noted that the formulation B began to boil when the temperature was raised to 250 degrees Fahrenheit. This boiling phenomenon was also observed in forming and was possibly due to evaporation of small molecules such as methanol or even a silane coupling agent.

The uniformity of the size was determined to be good throughout the run. This was observed by directing a UV light at the applicator roll and the strand between the applicator roll and the primary gathering shoe. In addition, using the UV dye allowed visual observation and determination that the ¾ inch KEM applicator applied the size coatings uniformly down to approximately 1%. It also appeared to work up to levels as high as 6%. Above 6%, problems developed with dripping from the applicator, however, these problems can be alleviated by a combination of roll speed and gasket thickness.

All of the sizings of Examples I, II and III were applied as follows. The NEAT size formulation is precompounded and held in a suitably sized container. The NEAT sizing temperature is increased to a predetermined level to reduce the viscosity to an acceptable range. The sizing is then pumped to the applicator using a metering pump (Zenith Gear Type Pump). The sizing is pumped through heated lines to keep the viscosity at the proper level. The applicator is a slot type applicator which transforms the moving size from a round circular cross-section to a wide flat ribbon which is deposited onto a rotating roll which in turn delivers the size to the glass fibers as they are passing across its surface.

The preferred apparatus typically comprises: a heated bushing for supplying streams of molten glass to be drawn into continuous fibers; a device adapted to draw the streams into the fibers; and a sizing applicator. The sizing applicator includes a housing and a roll applicator which is rotatably coupled to the housing. The housing has a supply port adapted to receive sizing composition under pressure from a sizing supply source, an exit slot and a passageway extending from the supply port to the exit slot. The passageway receives sizing composition from the supply port and delivers the sizing composition to the exit slot such that the sizing composition exits the housing and is received on an outer surface of the roll applicator. The roll applicator is spaced from the housing such that the housing does not substantially contact and alter sizing composition thickness of the sizing composition received on the roll applicator.

The roll applicator preferably rotates about a central axis which lies in a generally horizontal plane. The exit slot may be positioned above the horizontal plane such that the sizing composition exits the housing and is received on the outer surface of the roll applicator above the horizontal plane.

The roll applicator further includes first and second end portions. In one embodiment, the first end portion has first spirals or threads and the second end portion has second spirals or threads. The first and second spirals are of opposite hands so as to divert sizing composition which contacts the first and second end portions inwardly as the roll applicator rotates. Preferably, the passageway has a cross-sectional area which is generally constant from the supply port to the exit slot.

The apparatus further includes drive apparatus for effecting rotation of the roll applicator. The drive apparatus comprises a motor assembly and a clutch assembly. The motor assembly includes a motor having an output shaft and a drive pulley coupled to the output shaft so as to rotate with the output shaft. The clutch assembly includes: a clutch housing; a first shaft rotatably mounted in the housing and including an inner bore; a second shaft positioned in the bore and including an annular shoulder and a distal end portion adapted to engage the roll applicator such that rotation of the second shaft effects rotation of the roll applicator; a spring positioned in the bore and engaging the annular shoulder of the second shaft; a spring retainer secured to the first shaft so as to rotate with the first shaft and engaging and retaining the spring in the bore; and a belt positioned about the drive pulley and a portion of the first shaft such that rotation of the drive pulley effects rotation of the first shaft. The spring effects rotation of the second shaft upon rotation of the first shaft. The portion of the first shaft may comprise a drive pulley mounted to the first shaft.

The distal end portion of the second shaft preferably includes a pin which extends generally transversely to a central axis of the second shaft. The pin is adapted to engage a pin-receiving notch provided in the roll applicator.

Another preferred applicator comprises a housing and roll applicator which is rotatably coupled to the housing. The housing has a supply port adapted to receive sizing composition from a sizing supply source, an exit slot and a passageway extending from the supply port to the exit slot. The passageway receives sizing composition from the supply port and delivers the sizing composition to the exit slot such that the sizing composition exits the housing and is received on an outer surface of the roll applicator. The roll applicator is spaced from the housing such that the housing does not substantially alter sizing composition thickness of the sizing composition received on the roll applicator.

A system such as described above is required in order to apply an extremely thin (0.10μ) film on the surface of the glass fibers. The forming evaluation is presented in Table V below.

applicator; the NEAT version was applied at a roll speed of 10.5 feet per minute which was the minimum the roll would run. The 5% hydrolized sizes were applied at 34 feet per minute. The NEAT (non-hydrolized) sizes were run without prepads and the applicator pan was washed with acetone and then air dried so as to prevent any water from coming into contact with the silane prior to application to the glass fibers.

The packages were immediately double bagged in polyethylene bags so as to prevent moisture from contacting the glass. Later, coin envelopes full of Dry Rite™ were placed in the bags so as to absorb any water.

The various samples which were run were as follows:

| Formulation 34-A | NEAT A174* |
| Formulation 34-B | NEAT A187 |
| Formulation 34-C | NEAT A1100 |
| Formulation 34-D | 5% solution A174, 0.2% HoAc, 94.8% H$_2$O (deionized) |
| Formulation 34-E | 5% solution A187, 0.2% HoAc, 94.8% H$_2$O (deionized) |

TABLE V

| Package No. | 1 | 2 | 3 | 4 | 5 | 6 | *7 | 8 | 9 | 10 | **11 |
|---|---|---|---|---|---|---|---|---|---|---|---|
| Controller, setting, Hz | 20 | 15 | 15 | 15 | 40 | 80 | 15 | 15 | 15 | 15 | 15 |
| Size Feed, gms/min. | 10 | 7.5 | 7.5 | 7.5 | 20 | 20 | 40 | 7.5 | 7.5 | 7.5 | 7.5 |
| Applicator Roll Speed, rpm | 60 | | 40 | 40 | 58 | 58 | 48 | 28 | 28 | 28 | 28 |
| Prepad Sprays | No | → | → | → | → | → | → | → | → | → | → |
| Air Knife (PSI) | (20) Yes | No | (20) Yes | (20) Yes | No | (20) Yes | (20) Yes | (20) Yes | (20) Yes | (20) Yes | (30) Yes |
| Sliver | M-4.50 | → | → | → | → | → | → | → | → | → | T-2.25 |
| Applicator Temp ° F. | 175 | → | → | → | → | 150 | → | 200 | → | → | → |
| Strand Solids, % wt | 1.64 | 1.12 | 1.07 | 1.10 | 2.87 | 3.16 | 5.95 | 1.22 | 1.16 | 1.10 | |
| Yardage, yds/lb. | 395 | 378 | 403 | 403 | 398 | 402 | | 410 | 415 | 396 | 401 |

*Could not stop the dripping — Raised, Lowered, Moved Applicator and shoe to numerous positions to no avail.
**Beaded out after 1 minute — the sizing was foaming out of the applicator at this point. Could not determine what was happening. Later it was determined that the sizing was actually boiling at a very low rate. It boiled at approximately 80° C./176° F.

EXAMPLE IV

Samples were prepared so as to determine whether the performance of nonhydrolized silanes in the composites was equivalent to the performance of hydrolyzed silanes. Three silanes were chosen for evaluation; A174, A187, and A1100 (obtained from OSi Specialities, Inc.) Each of the silanes was applied to glass fibers as pure single component sizings and thereafter having been hydrolyzed with acidified deionized water. Sizings were applied with a standard 3" graphite -continued

| Formulation 34-F | 5% solution A1100, 0.2% HoAc, 94.8% H$_2$O (deionized) |
| Formulation 34-G | Deionized H$_2$O |

*The A174 5% solution never became crystal clear whereas the A187 and A1100 solutions did. However, it did appear clear on the applicator roll.

The results of the tests (ASTM test method) for flexural strength on the polyester rods are as shown in Table VI below:

TABLE VI

Flexural Strength — Polyester Rods — Test Results

| | | Strand Solids, | Flexural Stress, PSI | | | | Glass Content |
| | | | Dry | | 72 Hr. Boil | | % | |
| Sample No. | | % wt. | Avg. | σ | Avg. | σ | Retention | % wt. |
|---|---|---|---|---|---|---|---|---|
| NEAT A174 | 34-A | 0.99 | 187,028 | 11,479 | 164,418 | 10,958 | 87.9 | 66.90 |
| NEAT A187 | 34-B | 0.66 | 129,413 | 11,013 | 126,735 | 7,930 | 97.9 | 67.40 |
| NEAT A1100 | 34-C | 0.15 | 166,997 | 17,991 | 107,893 | 14,492 | 64.6 | 68.20 |

TABLE VI-continued

Flexural Strength — Polyester Rods — Test Results

| | Sample No. | Strand Solids, % wt. | Flexural Stress, PSI | | | | % Retention | Glass Content % wt. |
|---|---|---|---|---|---|---|---|---|
| | | | Dry | | 72 Hr. Boil | | | |
| | | | Avg. | σ | Avg. | σ | | |
| Hydrolyzed A174 | 34-D | 0.54 | 180,900 | 12,130 | 148,600 | 12,860 | 82.1 | 68.60 |
| Hydrolyzed A187 | 34-E | 0.45 | 137,500 | 14,540 | 87,560 | 9,262 | 63.7 | 67.88 |
| Hydrolyzed A1100 | 34-F | 0.36 | 184,800 | 15,970 | 99,760 | 9,253 | 54.0 | 67.95 |
| Deionized H₂O | 34-G | 0.08 | 176,400 | 14,240 | 66,130 | 9,749 | 37.5 | 67.08 |

This example demonstrates that the A174 sizing performed well in both the hydrolyzed and nonhydrolyzed versions. The A187 sizing performed poorly in the hydrolyzed and nonhydrolyzed versions, however, it was especially poor in the hydrolyzed version with regard to retention. The A1100 sizing performed well in the nonhydrolyzed, however poorly in the wet or hydrolyzed version. The hydrolyzed silanes on the glass strands were difficult to wet out and the strands were stiff with the bundles well bonded together. As a result, the cured rods were opaque, whereas the NEAT version rods were clearer than the others.

EXAMPLE V

The effectiveness of the silanes was further evaluated in the nonaqueous NEAT sizings. In this series, the A174 was evaluated as a single coupling agent and also as a blend 50/50 with the A187 silane. The series further tested the effect of BES by running with it and without it. The ⅜" KEM applicator was used and the bushing temperature was 2270° Fahrenheit. The formulations were as shown in Table VII below; and the forming evaluation is presented in Table VIII.

TABLE VII

| Size No. | 36-A | 36-B | 36-C | 36-D |
|---|---|---|---|---|
| DER337 | 51.27 | 53.97 | 51.27 | 25.65 |
| Araldite GT713 | — | — | — | 25.65 |
| Pluronic L101 | 2.79 | 2.94 | 2.79 | 2.79 |
| Pluronic P105 | 8.46 | 8.90 | 8.46 | 8.46 |
| A174* | 6.01 | 6.33 | 12.02 | 6.01 |
| A187 | 6.01 | 6.33 | — | 6.01 |
| PEG400MO | 20.45 | 21.53 | 20.45 | 20.45 |
| BES | 5.00 | — | 5.00 | 5.00 |

TABLE VIII

| Size No. | 36-C (A174) | | | | | | 36-A (A174/A187) | | | | | |
|---|---|---|---|---|---|---|---|---|---|---|---|---|
| Package No. | 1 | 2 | 3 | 4 | 5 | 6 | 7 | 8 | 9 | 10 | 11 | 12 |
| Controller, Hz | 60 | 50 | 40 | 30 | 20 | 40 | 30 | 20 | 14 | 50 | 60 | 50 |
| Gasket Tk, Mils | 5 | → | → | 3 | → | 3 | → | → | → | 5 | → | → |
| Gasket Width, in. | 1¼ | → | → | → | → | → | → | → | → | → | → | → |
| Size Cone, gms/min. | ~30 | ~25 | ~20 | 15 | 10 | 20 | 15 | 10 | 7 | 25 | 30 | 25 |
| App. Roll Speed, rpm | 196 | 180 | 132 | 148 | 84 | 196 | 136 | 92 | 48 | 140 | 167 | 164 |
| Prepads | No | → | → | → | → | → | → | → | → | → | → | → |
| Air Knife, PSI | 10 | → | → | → | → | → | → | → | → | → | → | → |
| Package Temp, °F. | 126 | | | | | | | | | | | |
| Bush — App., in. | 70 | → | → | → | → | → | → | → | → | → | → | → |
| App. — Shoe, in. | 7⅞ | → | → | → | → | → | 7⅞ | → | → | → | 7¼ | → |
| Fan width, in. | 1⅝ | → | → | → | → | → | 1⅝ | → | → | → | 1¼ | → |
| App. Temp. °F. | | | | | | | | | | | | |
| Strand Solids, % wt. | 3.81 | 3.09 | 2.71 | 1.47 | 1.36 | | 1.90 | 1.50 | 1.02 | 3.07 | 3.82 | 4.00 |
| Yardage, Yds/Lb | 368 | 367 | 390 | 400 | 396 | | 383 | 380 | 403 | 410 | 394 | 390 |

TABLE IX

Flexural Strength — Polyester Rods — Test Results

| | Sample No. | Strand Solids, % wt. | *Flexural Stress, PSI | | | | % Retention | Glass Content % wt. |
|---|---|---|---|---|---|---|---|---|
| | | | Dry | | 72 Hr. Boil | | | |
| | | | Avg. | σ | Avg. | σ | | |
| 36-C 100% A174 | 136-1 | 3.83 | 227,000 | 7,870 | 200,300 | 5,127 | 88.2 | 70.67 |
| | 136-2 | 3.09 | 223,300 | 9,971 | 184,000 | 7,147 | 78.9 | 69.47 |
| | 136-3 | 2.71 | 197,500 | 11,030 | 173,500 | 9,224 | 87.8 | 68.01 |

TABLE IX-continued

Flexural Strength — Polyester Rods — Test Results

| | Sample No. | Strand Solids, % wt. | Dry Avg. | Dry σ | 72 Hr. Boil Avg. | 72 Hr. Boil σ | % Retention | Glass Content % wt. |
|---|---|---|---|---|---|---|---|---|
| | 136-4 | 1.47 | 192,600 | 7,164 | 170,000 | 6,465 | 88.3 | 67.00 |
| | 136-5 | 1.36 | 197,500 | 14,550 | 178,900 | 11,990 | 90.6 | 67.69 |
| | 136-6 | 2.65 | 184,300 | 6,044 | 164,700 | 7,630 | 89.4 | 66.94 |
| 36-A | 136-7 | 1.90 | 215,400 | 9,666 | 177,600 | 8,710 | 82.5 | 68.95 |
| 50/50 | 136-8 | 1.50 | 219,700 | 16,040 | 174,000 | 13,010 | 79.2 | 68.88 |
| A174/A187 | 136-9 | 1.02 | 185,700 | 12,980 | 165,800 | 9,120 | 89.3 | 66.92 |
| | 136-10 | 3.07 | 193,000 | 111,540 | 167,500 | 9,595 | 86.8 | 65.97 |
| | 136-11 | 3.82 | 186,700 | 13,520 | 173,600 | 7,038 | 93.0 | 67.66 |

*The flexural stress numbers were calculated based on a nominal 0.150 inch diameter rod. Actual diameters were from 0.151–0.155. This will reduce the values.

Figure 4A:
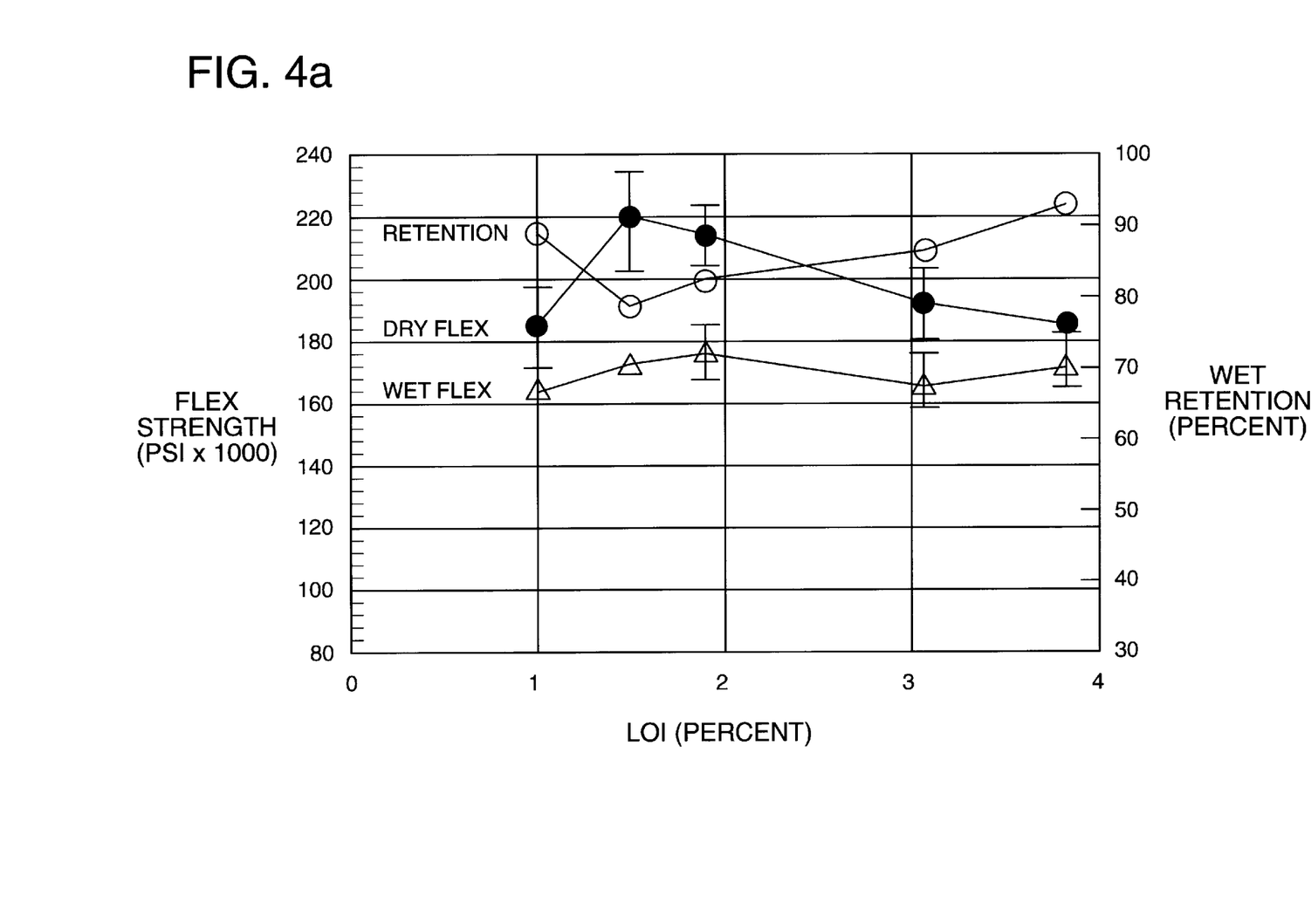
FIG. 4a demonstrates the effectiveness of the silane when used in nonaqueous sizings. The graphs show dry flex, wet flex and wet strength retention to be good at a wide range of LOI, 1–4%, in anhydride epoxy resins.
Figure 4B:
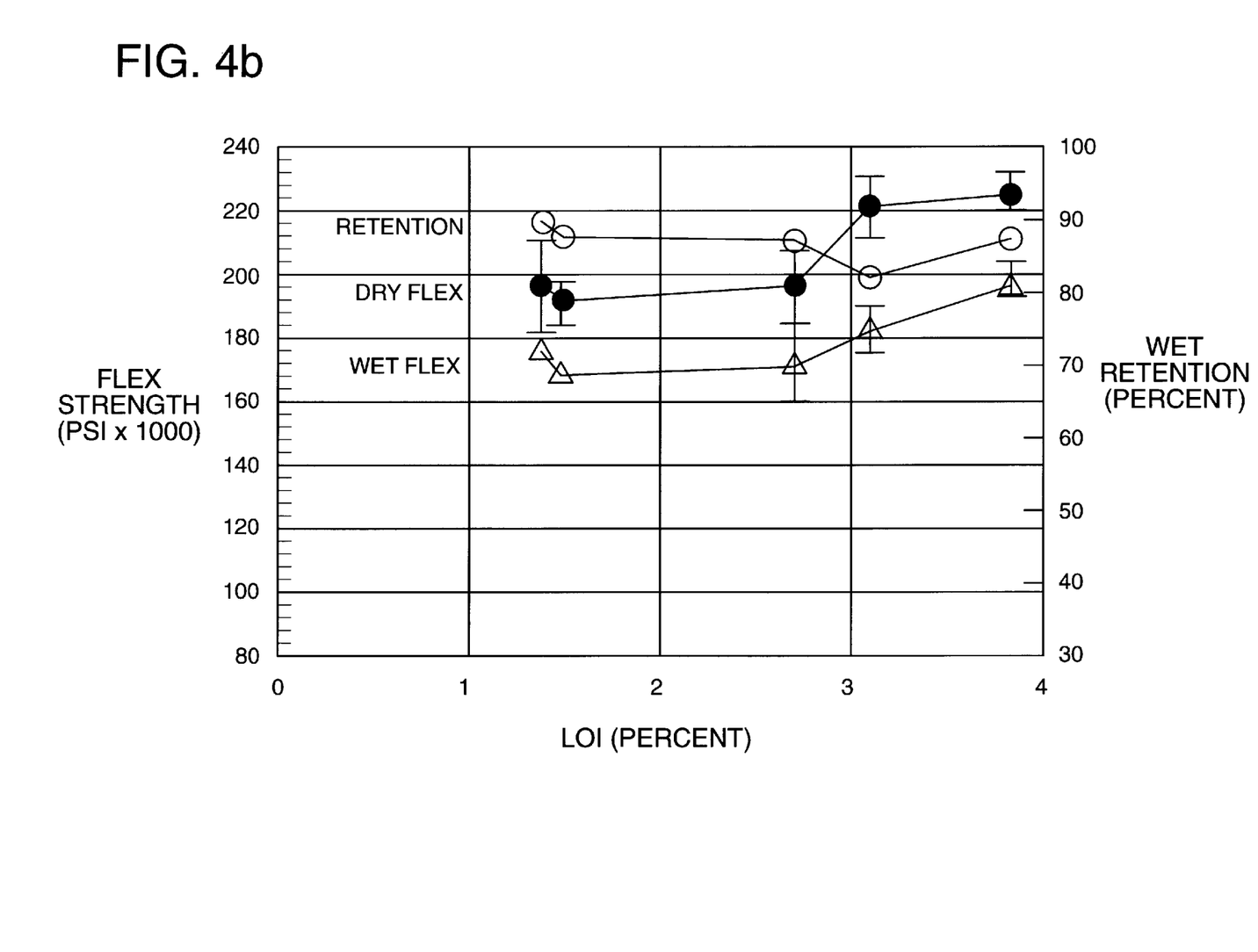
Figure 4C:
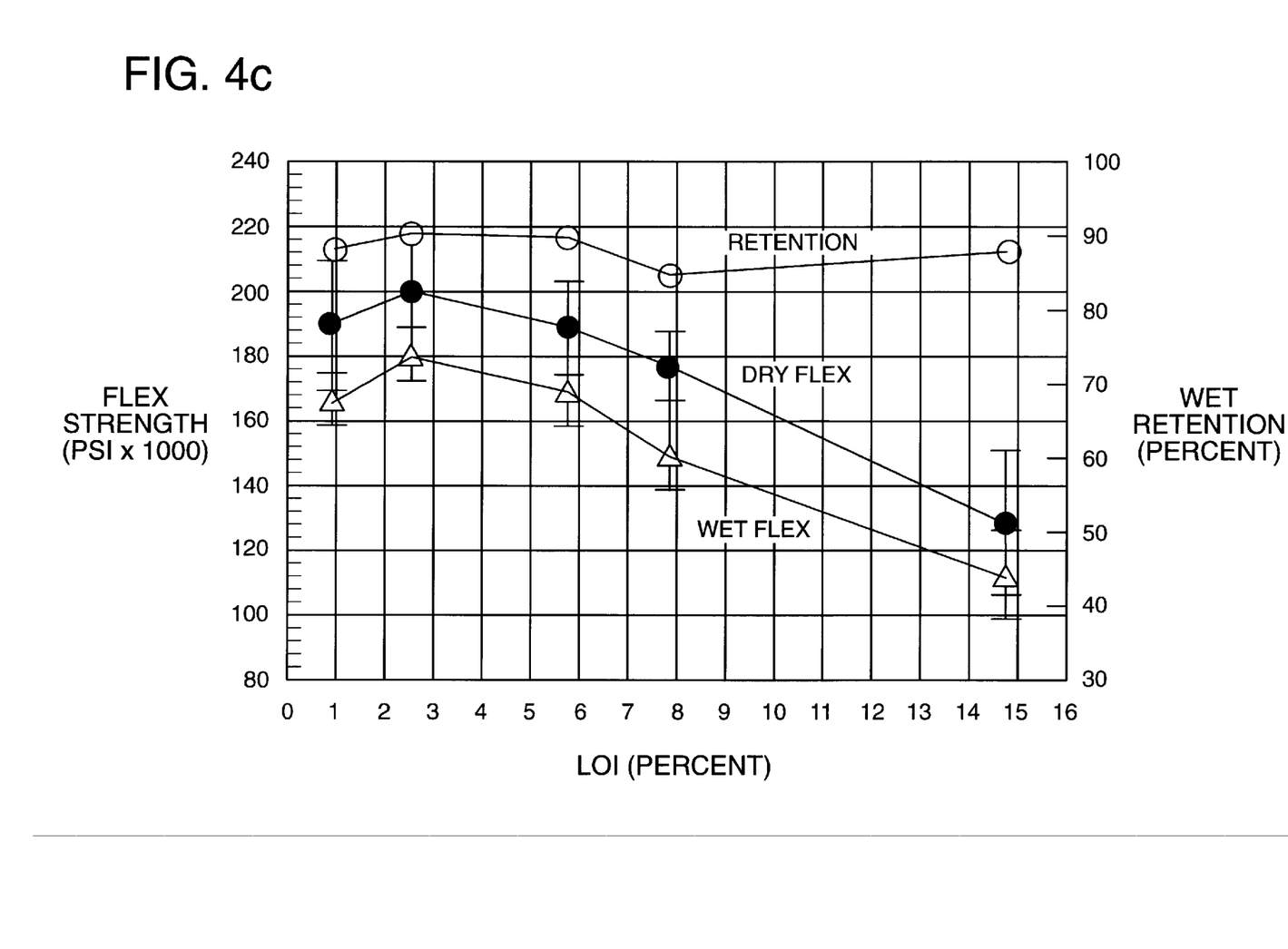
FIG. 4c demonstrates that composite properties are good up to around 5–6% LOI on the glass.

The data in Table IX above is graphed and shown in FIGS. 4a and 4b. This data demonstrates that the silanes are effective when used in nonaqueous sizings. The values for the dry flex, wet flex and wet strength retention are all good. In light of the scatter in the data, the data was repeated on a wider LOI range and is shown in FIG. 4c.

TABLE X

| Size No. | Sample No. | Strand Solids, % wt. | Dry Avg. | Dry σ | 72 Hr. Boil Avg. | 72 Hr. Boil σ | % Retention | Glass Content % wt. |
|---|---|---|---|---|---|---|---|---|
| 36-C | 36-1 | 3.83 | 6.93 | 0.29 | 4.72 | 0.53 | 68.3 | 74.8 |
| 100% A174 | 36-2 | 3.09 | 7.21 | 0.50 | 2.97 | 0.23 | 41.2 | 76.6 |
| | 36-3 | 2.71 | 4.05 | 0.15 | 1.85 | 0.15 | 45.7 | 77.1 |
| | 36-4 | 1.47 | 6.90 | 0.33 | 2.87 | 0.21 | 41.6 | 74.6 |
| | 36-5 | 1.36 | 5.86 | 0.34 | 3.02 | 0.18 | 51.6 | 76.7 |
| | 36-6 | 2.65 | 6.54 | 0.16 | 3.58 | 0.34 | 54.8 | 76.3 |
| 36-A | 36-7 | 1.90 | 7.92 | 0.12 | 7.04 | 0.33 | 88.9 | 78.1 |
| 50/50 | 36-8 | 1.50 | 7.97 | 0.16 | 6.83 | 0.14 | 85.7 | 76.7 |
| A187/A174 | 36-9 | 1.02 | 7.97 | 0.17 | 6.57 | 0.40 | 82.4 | 74.4 |
| | 36-10 | 3.07 | 7.62 | 0.36 | 6.31 | 0.12 | 82.9 | 76.2 |
| | 36-11 | 3.82 | 7.05 | 0.20 | 5.76 | 0.30 | 81.8 | 76.1 |
| 26-A | 32-2 | 0.45 | 7.88 | 0.13 | 7.68 | 0.16 | 97.4 | 72.6 |
| 100% A187 | 32-9 | 4.51 | 7.37700 | 0.18 | 6.30 | 0.22 | 85.5 | 75.6 |
| | 32-11 | 2.99 | 7.553 | 0.11 | 7.02 | 0.09 | 93.2 | 76.3 |
| | 32-12 | 2.34 | 7.55 | 0.07 | 7.35 | 0.08 | 97.4 | 71.6 |
| | 32-13 | 2.06 | 8.50 | 0.36 | 7.57 | 0.31 | 89.0 | 72.4 |
| | 32-14 | 1.44 | 8.54 | 0.17 | 7.84 | 0.17 | 91.8 | 70.9 |
| | 32-15 | 1.08 | 8.32 | 0.11 | 7.67 | 0.365 | 92.2 | 71.2 |
| | 26-7 | 5.95 | 7.84 | 0.35 | 5.76 | 0.17 | 73.6 | 73.1 |

EXAMPLE VI

In this series, the ratio of DER 337 to GT 7013 was varied so as to produce a more stable system at elevated temperatures. The formulations were as shown in Table XI.

TABLE XI

| | Size No. | | | | | |
|---|---|---|---|---|---|---|
| Component | 44-A | 44-B | 44-C | 44-D | 44-E | 44-F |
| DER337 | 56.9 | 51.22 | 45.52 | 39.84 | 34.14 | 28.46 |
| GT7013 | — | 5.70 | 11.38 | 17.08 | 22.76 | 28.46 |
| L101 | 3.16 | → | → | → | → | → |
| P105 | 9.26 | → | → | → | → | → |
| PEG400MO | 12.88 | → | → | → | → | → |
| A187 | 11.48 | → | → | → | → | → |
| BES | 6.34 | → | → | → | → | → |

The DER 337 and GT 7013 were weighed and placed in a suitably sized container. The GT 7013 was heated until it melted. Agitation was applied so as to assist in blending the two components together. The temperature was limited to 110° C. since the GT 7013 contains a high percentage of entrapped air which should have been released at that temperature. The P105 was weighed and added to mix and allowed to melt while maintaining agitation. Agitation was continued until the solution was homogeneous. The L101 was added to the mixture and stirred until homogeneous. The same procedure was carried out for the PEG400MO. Heating was discontinued at this time as the remaining components are more easily compatible and dispersed at lower temperatures. The BES was added and stirred until homogeneous.

The mixture was cooled to below 80° C. and then the A187 was added with stirring until homogeneous. At this point, the sizings were clear and free of air. They were allowed to cool for storage then reheated to suitable temperature for pumping prior to running in the forming.

Figure 5:
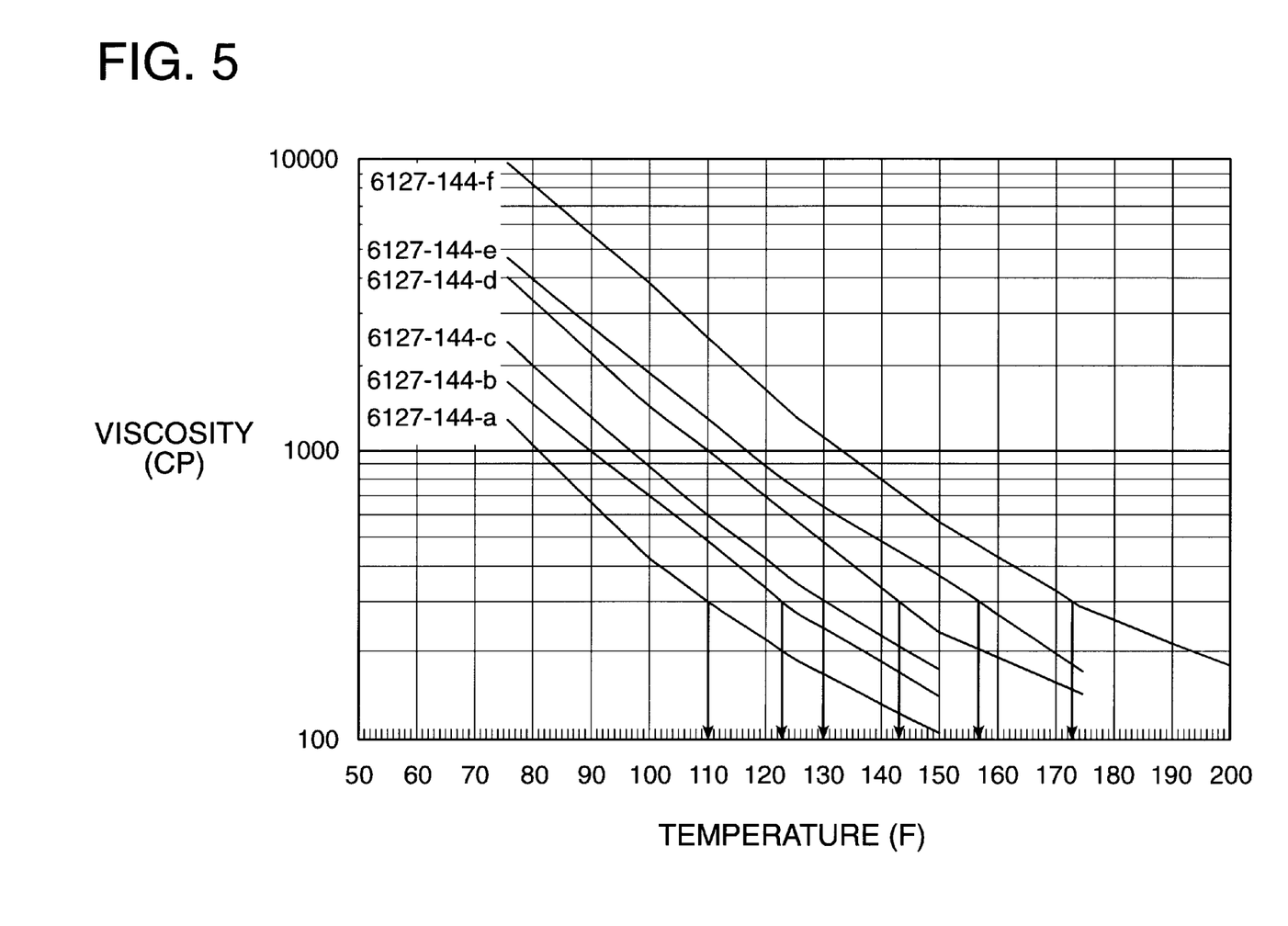
FIG. 5 is a graph of viscosity versus temperature for a series of sizings prepared by varying the ratio of two epoxy resins in the formulation. One is a solid; the other a liquid at room temperature. This allows for changing strand properties and forming conditions.

Viscosity versus temperature curves were run on each of the sizes and are graphed and shown in FIG. 5. The viscosity target for the running during the forming process was 300 cps.

EXAMPLE VII

In this series, the effect of the silane concentration on the glass fibers versus the composite properties was studied. The formulations are shown below in Table XII. The results are shown in FIG. 3.

Figure 3A:
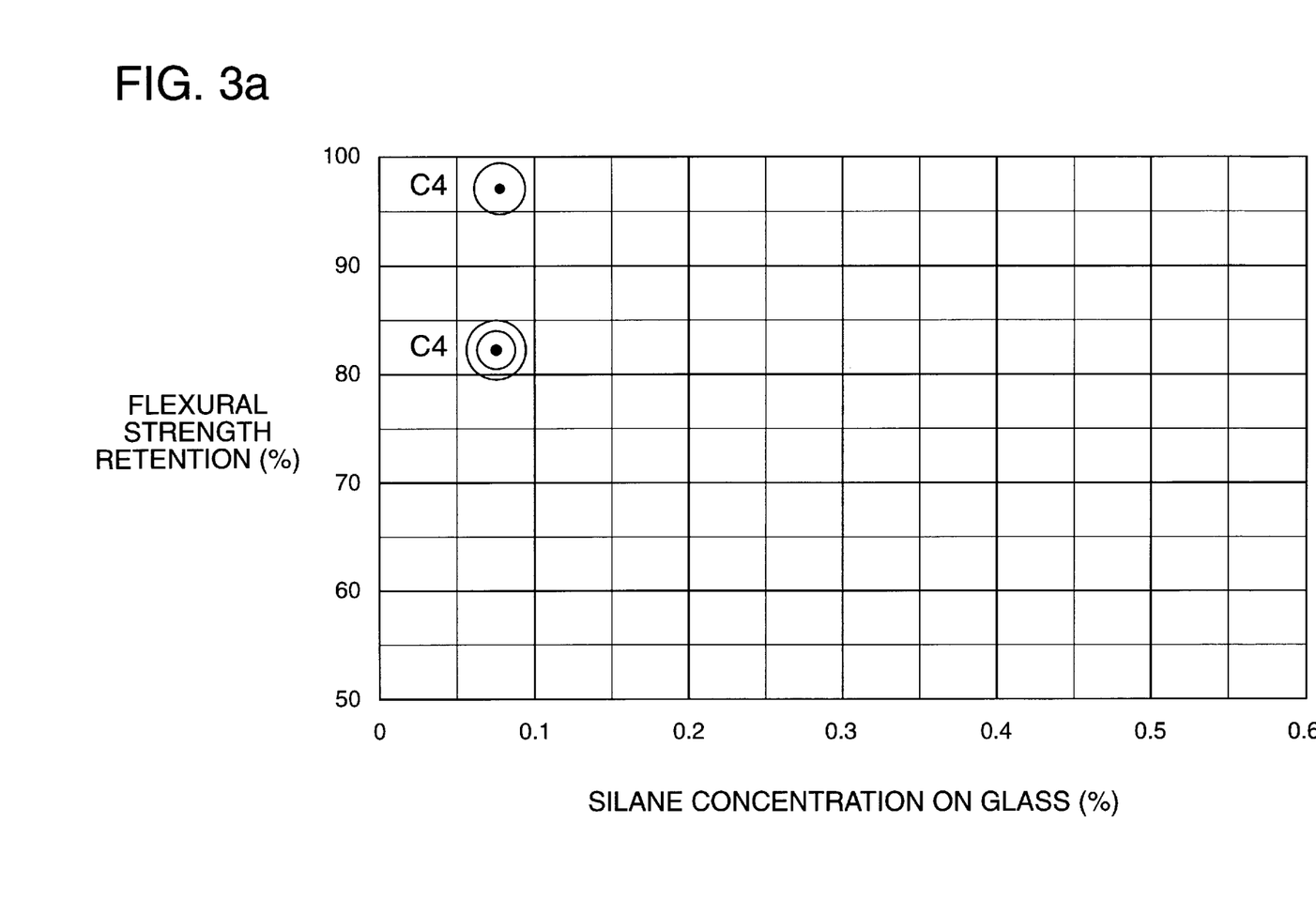
FIGS. 3a and 3b are of the flex strength retention for polyester rods.
Figure 3B:
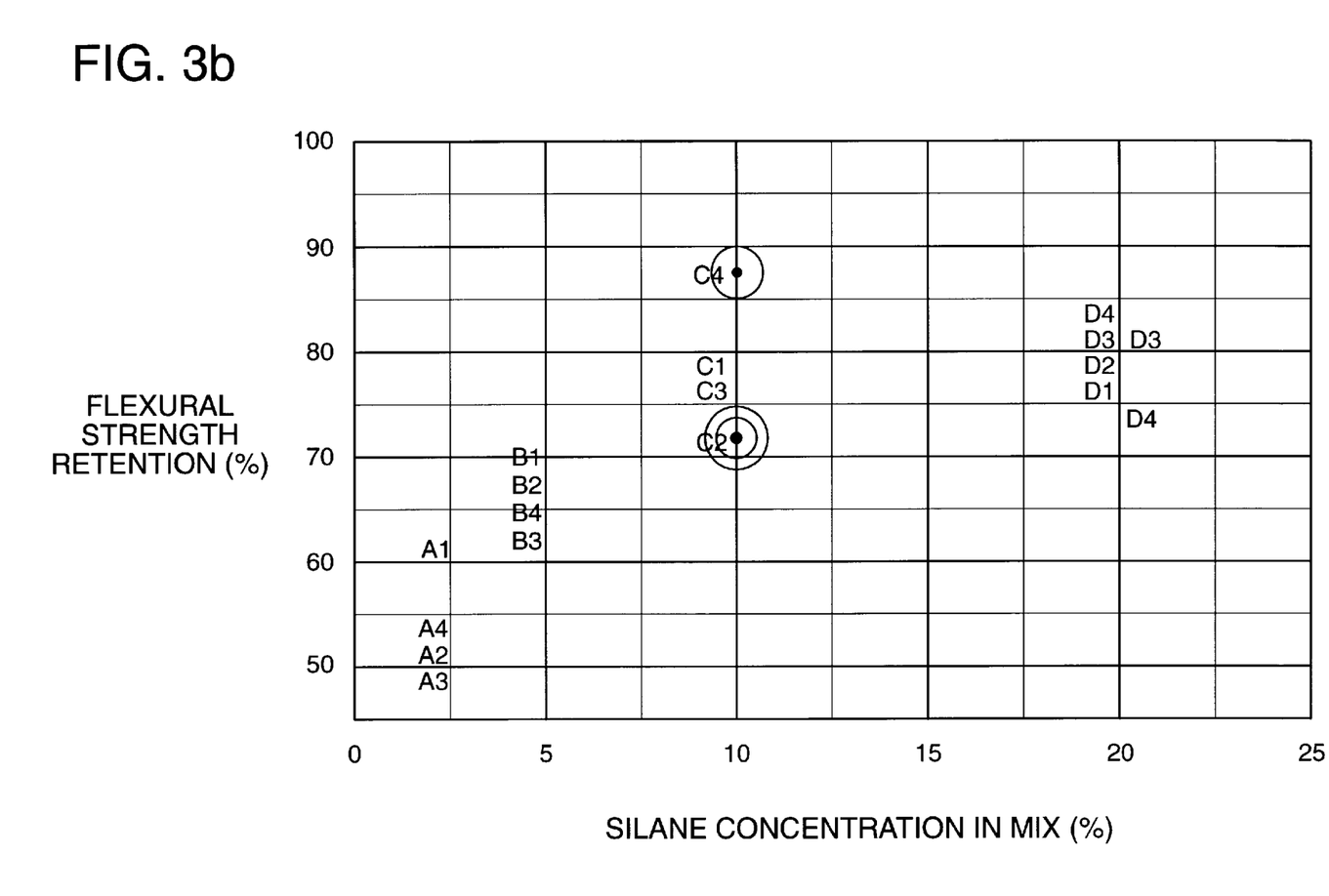
Figure 3C:
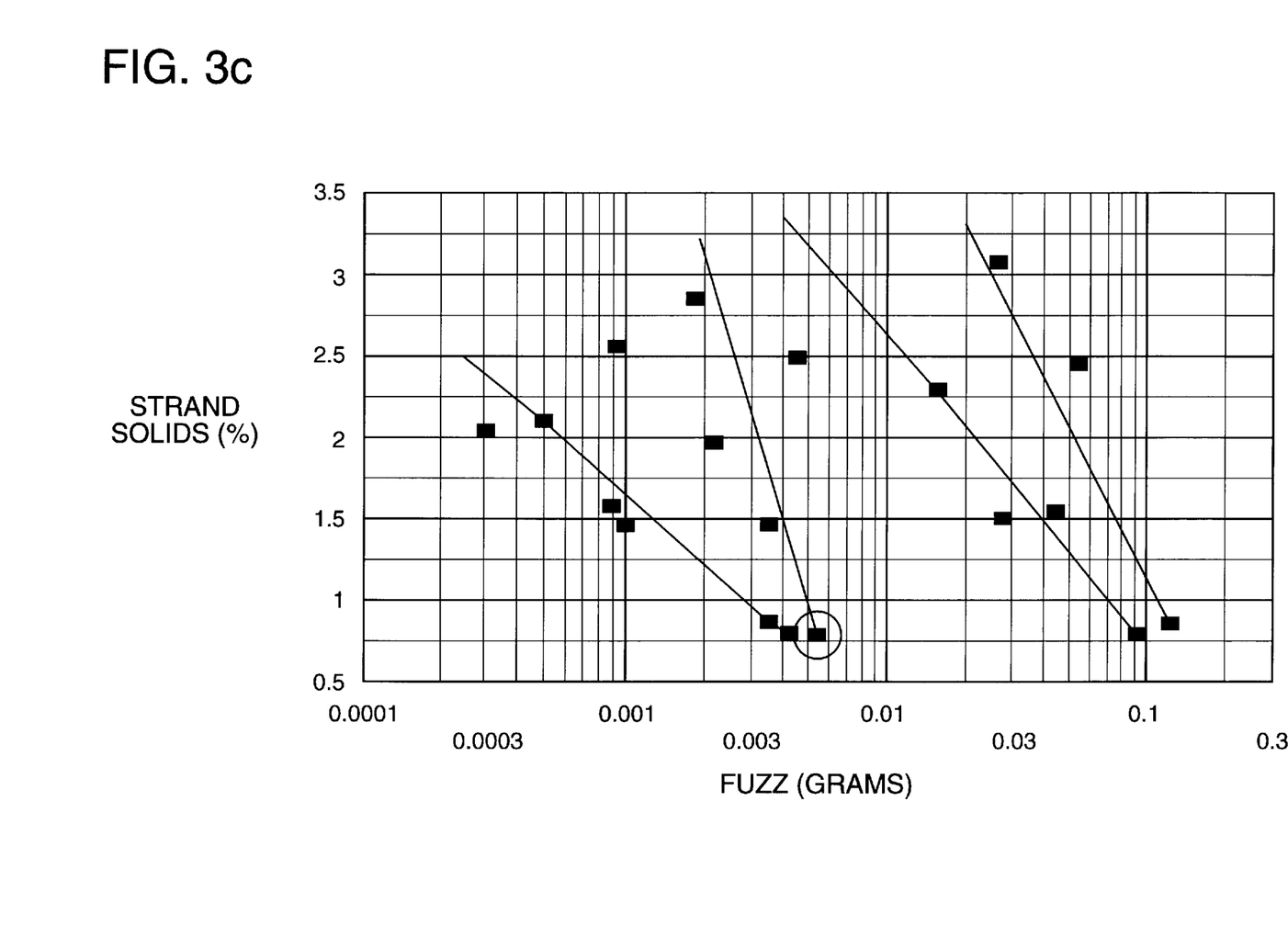
FIG. 3c shows the relationship between fuzz and strand solids while at the same time taking into account the silane concentration in the size.
Figure 3D:
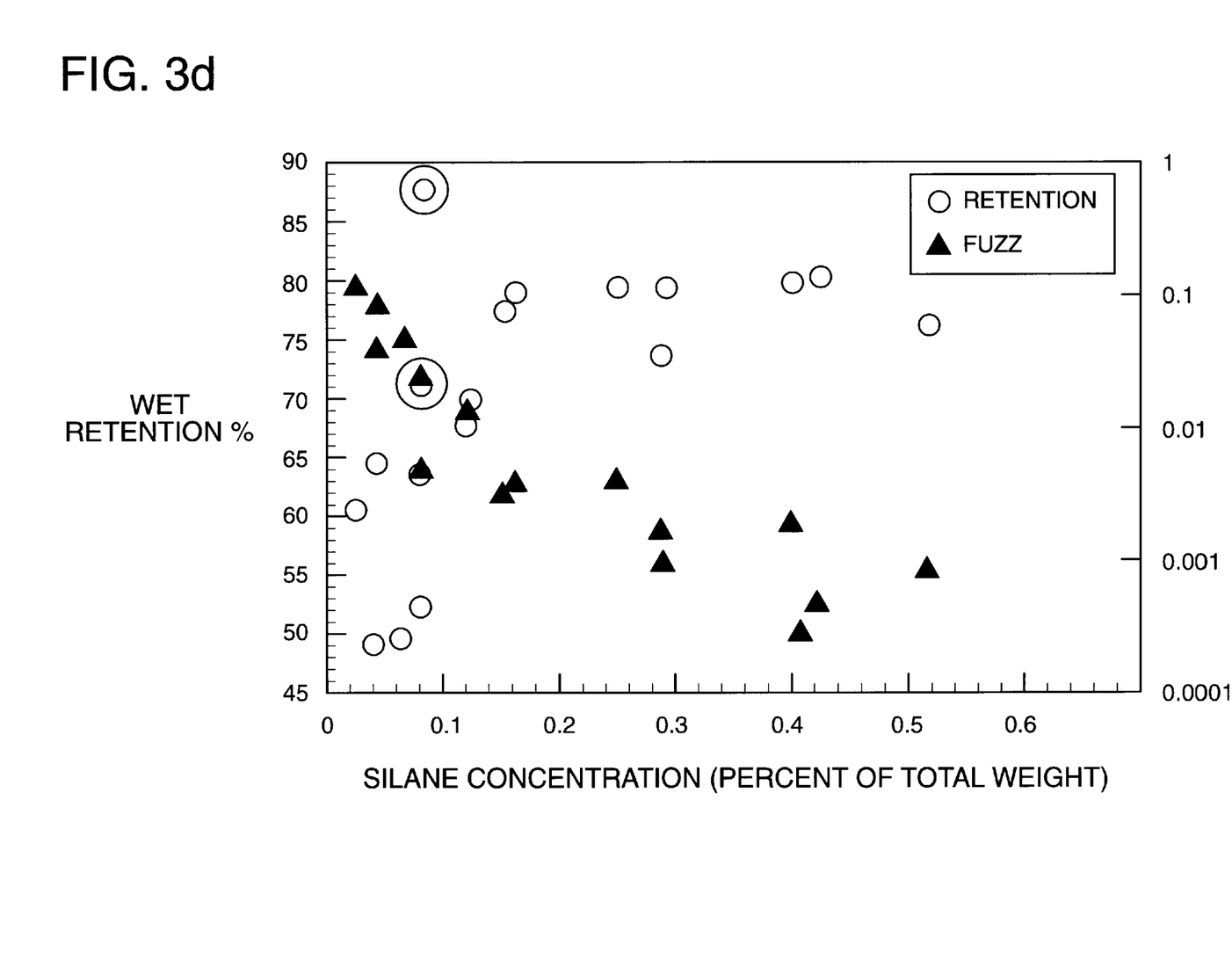
FIG. 3d shows the effect of the silane concentration on the glass on both wet strength retention and the amount of fuzz on the glass. Increasing silane concentration improves wet strength retention and reduces the amount of fuzz. Both are positive.

FIG. 3*d* demonstrates that fuzz can be reduced as silane concentration in the glass is increased. In particular, the fuzz can be reduced provided a proper concentration of lubricant or silane is used. The data additionally shows that as long as the silane concentration is >0.15% on the glass, the percent retention is maximized.

TABLE XII

| | Size No. | | | | | | | |
|---|---|---|---|---|---|---|---|---|
| | 90-A | | 90-B | | 90-C | | 90-D | |
| Components | % As | Grams | % As | Grams | % As | Grams | % As | Grams |
| 1. Dow DER 337 | 33.825 | 405.9 | 32.80 | 393.6 | 30.75 | 369.0 | 26.65 | 319.8 |
| 2. GT 7013 | 33.825 | 405.9 | 32.80 | 393.6 | 30.75 | 369.0 | 26.65 | 319.8 |
| 3. Pluronic L101 | 3.791 | 45.49 | 3.676 | 44.11 | 3.446 | 41.35 | 2.987 | 35.84 |
| 4. Pluronic P105 | 11.059 | 132.71 | 10.724 | 128.69 | 10.054 | 120.65 | 8.713 | 104.56 |
| 5. PEG 400 MO | 10.0 | 120.0 | 10.0 | 120.0 | 10.0 | 120.0 | 10.0 | 120.0 |
| 7. A174* | 2.5 | 30.0 | 5.0 | 60.0 | 10.0 | 120.0 | 20.0 | 240.0 |
| 6. BES | 5.0 | 60.0 | 5.0 | 60.0 | 5.0 | 60.0 | 5.0 | 60.0 |
| Total | 100.0 | 1200.0 | 100.0 | 1200.0 | 100.0 | 1200.0 | 100.0 | 1200.0 |

Mixing Procedure: Direct addition in order indicated.
The A174 was added at the following temperatures: -A 172° F.; -B 174° F., -C 167° F., and -D 149° F.
*The PEG400MO was found to be incompatible with the A174 which in turn increased the viscosity of the mix after exposure to elevated temperatures for extended periods of time.

What is claimed is:

1. A nonaqueous sizing composition for application to glass or carbon fibers at high temperatures, comprising:
   (a) one or more low and/or medium molecular weight resins selected from the group consisting of epoxy, polyester, polyurethane, and urea;
   (b) one or more polymers or copolymers compatible with the one or more low and/or medium molecular weight resins;
   (c) one or more coupling agents; and
   (d) one or more lubricants,
   wherein the sizing composition is substantially free of wax.

2. The composition of claim 1, which includes an optical brightener in an effective amount for visual assessment of the uniformity of sizing application.

3. The sizing composition of claim 2, wherein said optical brightener is an ultraviolet fluorescent dye.

4. The sizing composition of claim 2, wherein said optical brightener is a colorant.

5. A process for producing reinforced plastic composites which comprises combining one or more resins and glass fibers having at least a portion of their surfaces covered with the residue of the nonaqueous sizing composition of claim 1.

6. A process for producing reinforced plastic composites which comprises combining one or more resins and carbon fibers having at least a portion of their surfaces covered with the residue of the nonaqueous sizing composition of claim 1.

7. The process of claim 6, wherein said plastic composite is selected from the group consisting of: epoxy polymers, polyester, urethanes, and polystyrene.

8. Glass or carbon fibers having at least a portion of their surfaces covered with the residue of the nonaqueous composition of claim 1.

9. A nonaqueous sizing composition comprising:
   (a) one or more low molecular weight epoxy resin;
   (b) one or more medium molecular weight epoxy resin;
   (c) one or more polyoxypropylene-polyoxyethylene block copolymers;
   (d) a lubricant; and
   (e) one or more gamma-methacryl oxypropyl trimethoxysilane coupling agents.

10. The composition of claim 9 which includes an optical brightner in an effective amount for visual assessment of the uniformity of sizing application.

11. The sizing composition of claim 10, wherein said optical brightener is an ultraviolet fluorescent dye.

12. Glass or carbon fibers having at least a portion of their surfaces covered with the residue of the nonaqueous sizing composition of claim 10.

13. A method for quantifying the forming process comprising:
   (a) adding an optical brightener to the nonaqueous sizing composition of claim 1;
   (b) applying the resulting mixture to glass fibers; and
   (c) directing an ultraviolet light at the coated glass fibers so as to visualize the optical brightener.

* * * * *